United States Patent
Young

(10) Patent No.: US 6,810,022 B1
(45) Date of Patent: Oct. 26, 2004

(54) FULL DUPLEX COMMUNICATION SLOT ASSIGNMENT

(75) Inventor: C. David Young, Plano, TX (US)

(73) Assignee: Rockwell Collins, Cedar Rapids, IA (US)

( * ) Notice: Subject to any disclaimer, the term of this patent is extended or adjusted under 35 U.S.C. 154(b) by 830 days.

(21) Appl. No.: 09/649,666

(22) Filed: Aug. 29, 2000

(51) Int. Cl.[7] .................................................. H04J 4/00
(52) U.S. Cl. ....................... 370/280; 370/347; 370/436
(58) Field of Search ................................. 370/329, 330, 370/336, 337, 436, 442, 458, 459, 280, 281, 347, 348

(56) References Cited

U.S. PATENT DOCUMENTS

| | | | |
|---|---|---|---|
| 4,504,946 A | 3/1985 | Raychaudhuri | 370/322 |
| 4,763,322 A | 8/1988 | Eizenhofer | 370/337 |
| 5,012,469 A | 4/1991 | Sardana | 370/322 |
| 5,117,422 A | 5/1992 | Hauptschein et al. | 370/255 |
| 5,245,609 A | 9/1993 | Ofek et al. | 370/348 |
| 5,295,140 A | 3/1994 | Crisler et al. | 370/443 |
| 5,396,496 A | 3/1995 | Ito et al. | 370/314 |
| 5,420,858 A | 5/1995 | Marshall et al. | 370/352 |
| 5,448,698 A | 9/1995 | Wilkes | 395/200.01 |
| 5,450,394 A | 9/1995 | Gruber et al. | 370/17 |
| 5,457,681 A | 10/1995 | Gaddis et al. | 370/402 |
| 5,502,722 A | 3/1996 | Fulghum | 370/69 |
| 5,506,848 A | 4/1996 | Drakopolous et al. | 370/336 |
| 5,568,477 A | 10/1996 | Galand et al. | 370/60 |
| 5,581,548 A | 12/1996 | Ugland et al. | 370/330 |
| 5,594,720 A * | 1/1997 | Papadopoulos et al. | 370/330 |
| 5,598,417 A | 1/1997 | Crisler et al. | 370/348 |
| 5,613,198 A | 3/1997 | Ahmadi et al. | 370/337 |
| 5,625,629 A | 4/1997 | Wenk | 370/330 |
| 5,644,576 A | 7/1997 | Bauchot et al. | 370/437 |
| 5,652,751 A | 7/1997 | Sharony | 340/2.4 |
| 5,696,903 A | 12/1997 | Mahany | 709/228 |
| 5,719,868 A | 2/1998 | Young | 370/436 |
| 5,742,593 A * | 4/1998 | Sharony et al. | 370/330 |
| 5,748,362 A | 5/1998 | Delacourt et al. | 359/326 |
| 5,920,703 A | 7/1999 | Campbell et al. | 709/236 |
| 5,949,760 A | 9/1999 | Stevens et al. | 370/280 |
| 5,953,344 A | 9/1999 | Dail et al. | 370/337 |
| 5,983,259 A | 11/1999 | Campbell et al. | 709/200 |
| 6,014,089 A | 1/2000 | Tracy et al. | 340/870.02 |
| 6,018,528 A | 1/2000 | Gitlin et al. | 370/436 |
| 6,031,827 A | 2/2000 | Rikkinen et al. | 370/330 |
| 6,084,888 A | 7/2000 | Watanabe et al. | 370/473 |
| 6,084,889 A | 7/2000 | Murakami | 370/474 |

(List continued on next page.)

OTHER PUBLICATIONS

C. David Young, "USAP: A Unifying Dynamic Distributed Multichannel TDMA Slot Assignment Protocol ," Proc. IEEE MILCOM 1996, vol. 1, Oct. 1996.

Chakraborty et al. "Generic Algorithm for Broadcast Scheduling in Packet Radio Networks," Evolutionary Computation Proceedings, 1998. IEEE World Congress on Computational Intelligence. May 4–9, 1998. pp. 183–188.

Pond et al. "A Distributed Time–Slot Assignment Protocol for Mobile Multi–Hop Broadcast Packet Radio Networks," IEEE MILCOM, 1989. Oct. 15–18, 1989. pp. 70–74.

(List continued on next page.)

Primary Examiner—Min Jung
(74) Attorney, Agent, or Firm—Nathan O. Jensen; Kyle Eppele

(57) ABSTRACT

A protocol for assignment, by an assigning node, of slots for full duplex communication in a dynamic distributed, multichannel, time division environment is disclosed. The protocol is suitable for use with a dynamic assignment protocol such as USAP. The protocol can identify slots available for allocation for unicast communications or for allocation for broadcast communications. Nodes of the network share communication slot scheduling information. A node having data to communicate can examine the shared information and thereby identify those communication slots that are available for full-duplex communication with a selected neighboring node.

18 Claims, 2 Drawing Sheets

U.S. PATENT DOCUMENTS

| | | | | |
|---|---|---|---|---|
| 6,088,659 | A | | 7/2000 | Kelley et al. .................. 702/62 |
| 6,094,425 | A | * | 7/2000 | Auger et al. ................. 370/330 |
| 6,094,429 | A | | 7/2000 | Blanchette et al. .......... 370/337 |
| 6,151,319 | A | | 11/2000 | Dommety et al. ..... 370/395.52 |
| 6,157,656 | A | | 12/2000 | Lindgren et al. ............ 370/458 |
| 6,252,868 | B1 | | 6/2001 | Diachina et al. ............ 370/347 |
| 6,256,304 | B1 | | 7/2001 | Vayrynen ..................... 370/350 |
| 6,256,477 | B1 | | 7/2001 | Eidson et al. .............. 455/63.3 |
| 6,275,506 | B1 | | 8/2001 | Fazel et al. .................. 370/459 |
| 6,304,559 | B1 | | 10/2001 | Jacklin et al. .............. 370/310 |
| 6,310,867 | B1 | | 10/2001 | Tat et al. ...................... 370/254 |
| 6,314,084 | B1 | | 11/2001 | Kahale et al. .............. 370/230 |
| 6,317,436 | B1 | | 11/2001 | Young et al. ............... 370/443 |
| 6,324,184 | B1 | | 11/2001 | Hou et al. .................. 340/7.43 |
| 6,331,973 | B1 | | 12/2001 | Young et al. ............... 370/337 |
| 6,353,598 | B1 | * | 3/2002 | Baden et al. ............... 370/280 |
| 6,353,605 | B1 | | 3/2002 | Rautanen et al. ........... 370/337 |
| 6,369,719 | B1 | | 4/2002 | Tracy et al. ........... 340/870.02 |
| 6,384,739 | B1 | | 5/2002 | Roberts, Jr. .................. 340/905 |
| 6,389,273 | B1 | | 5/2002 | Brandenburg ............... 455/296 |
| 6,414,955 | B1 | | 7/2002 | Clare et al. .................. 370/390 |
| 6,442,157 | B1 | | 8/2002 | Carter et al. ................ 370/347 |
| 6,466,793 | B1 | | 10/2002 | Wallstedt et al. ........... 455/450 |
| 6,469,996 | B1 | * | 10/2002 | Dupuy ....................... 370/337 |
| 6,487,186 | B1 | * | 11/2002 | Young et al. ............... 370/336 |
| 6,498,667 | B1 | | 12/2002 | Masucci et al. .............. 398/98 |
| 6,504,829 | B1 | | 1/2003 | Young et al. ............... 370/337 |
| 6,529,443 | B2 | | 3/2003 | Downey et al. .............. 367/76 |
| 6,553,424 | B1 | | 4/2003 | Kranz et al. ................. 709/234 |
| 6,556,899 | B1 | | 4/2003 | Harvey et al. ................. 701/29 |
| 6,574,199 | B1 | * | 6/2003 | Young et al. ............... 370/254 |
| 6,574,206 | B2 | * | 6/2003 | Young ........................ 370/337 |
| 6,600,754 | B1 | | 7/2003 | Young et al. ............... 370/459 |
| 6,628,636 | B1 | | 9/2003 | Young ........................ 370/337 |
| 6,631,124 | B1 | * | 10/2003 | Koorapaty et al. ......... 370/337 |
| 6,711,177 | B1 | | 3/2004 | Young ........................ 370/468 |
| 2002/0001294 | A1 | | 1/2002 | Amouris ...................... 370/337 |
| 2002/0046381 | A1 | | 4/2002 | Morris et al. ............... 714/752 |

OTHER PUBLICATIONS

Arikan, E. "Some Complexity Results about Packet Radio Networks," IEEE Transactions on Information Theory, v.IT–30, No. 4, Jul. 1984, pp. 681–685.

Chou et al. "Slot Allocation Strategies for TDMA Protocols in Multihop Packet Radio Network." Eleventh Annual Joint Conference of the IEEE Computer and Communications Societies. May 4–8, 1992. pp. 710–716.

Oono et al. "Dynamic Slot Allocation Technology for Mobile Multi–Media TDMA Systems Using Distributed Control Scheme," IEEE. Oct. 12–16, 1997. pp. 74–78.

U.S. patent application Ser. No. 09/650,332, "Scheduling Techniques for Receiver Directed Broadcast Applications," filed Aug. 29, 2000, C. David Young.

U.S. patent application Ser. No. 09/562,549, "Efficient Grouping of Control and User Data," filed May 2, 2000, J.A. Stevens et al. U.S. patent application Ser. No. 09/303,802, "Clique Activation Multiple Access," filed Apr. 30, 1999, C.D. Young et al.

L. Pond and V. Li, "Bridging the Gap Interoperability, Survivability, Security," 1989 IEEE MILCOM, Conference Record, vol. 1 of 3.

Bittle, Caples, Young, "Soldier Phone: An Innovative Approach to Wireless Multimedia Communications," 1998 IEEE MILCOM, vol. 3.

Sunlin, "A Hybrid Distributed Slot Assignment TDMA Channel Access Protocol," IEEE Military Communications Conference, 1990, vol. 3 of 3.

Young and Stevens, "Clique Activation Multiple Access (CAMA): A Distributed Heuristic for Building Wireless Datagram Networks," IEEE Military Communications Conference 1998, vol. 1. Ju et al. "An Optimal Topology–Transport Scheduling Method in Multihop Packet Radio Networks." IEEE/ACM Transactions on Networking. Jun. 1998. pp. 298–306.

U.S. application Ser. No. 09/422,498, "Method and Apparatus for Managing Communication Resources Using Dynamic and Static Assignment of Communication Slots," filed Oct. 21, 1999, C. David Young.

U.S. patent application Ser. No. 09/649,802, "Maintaining an Adaptive Broadcast Channel Using Both Transmitter Directed and Reciever Directed Broadcast," filed Aug. 29, 2000, C. David Young.

U.S. patent application Ser. No. 09/649,665, "Data Communication Techniques for Real Time Data Transmission," filed Aug. 29, 2000, T. Golubiewski et al.

I. Chlamtac and A. Farago, "An Optimal Channel Access Protocol with Multiple Reception Capacity," Dept. of Telecommunications & Telematics, Technical University of Budapest, Budapest, Hungary, Publication date unknown; believed to be 1993.

* cited by examiner

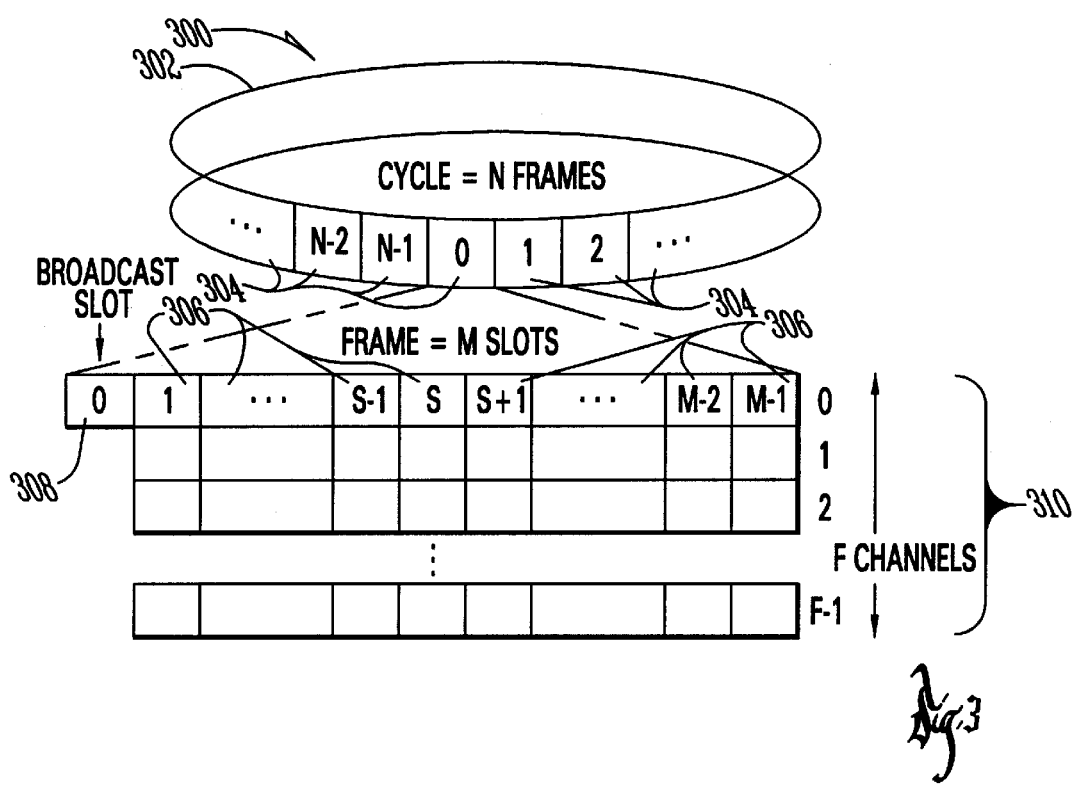

FULL DUPLEX COMMUNICATION SLOT ASSIGNMENT

CROSS REFERENCE TO RELATED APPLICATIONS

Cross-reference is made to related U.S. application Ser. No. 08/539,396, entitled Dynamic Distributed, Multi-Channel Time Division Multiple Access Slot Assignment Method for a Network of Nodes, filed Oct. 5, 1995 (now U.S. Pat. No. 5,719,868, issued Feb. 17, 1998).

FIELD OF THE INVENTION

The present invention generally relates to an improved dynamic assignment protocol for a radio network, more particularly relates to a protocol for full-duplex communication, and even more particularly relates to an extension to USAP for enabling full-duplex communication.

BACKGROUND OF THE INVENTION

Mobile multi-hop packet radio networks are known for rapid and convenient deployment, self-organization, mobility, and survivability. Many applications require self-organizing, wireless networks that can operate in dynamic environments and provide peer-to-peer, multi-hop, multi-media communications. Key to this technology is the ability of neighboring nodes to transmit without interference. Neighboring nodes transmit without interference by choosing time slots and channels that do not cause collisions at the intended unicast or multicast receivers.

Receivers are generally capable of processing only one transmission at a time. When using such receivers, simultaneous transmissions (also known as collisions, contentions or conflicts) can be avoided by assigning a specific transmission time slot to each communicating node. Several approaches have been developed for assigning communication slots to nodes. The approach chosen for a particular application is generally related to the type of network application (broadcast, multicast, unicast, datagrams, virtual circuits, etc.) being implemented.

The Unifying Slot Assignment Protocol (USAP), which is disclosed in U.S. Pat. No. 5,719,868, provides a protocol establishing one such contention avoidance system. USAP is a dynamic assignment protocol that monitors the RF environment and allocates channel resources on demand. It automatically detects and resolves contention between nodes for time slots, such contention arising for example from changes in connectivity. U.S. Pat. No. 5,719,868, issued Feb. 17, 1998, is hereby incorporated herein by reference in its entirety, including all drawings and appendices.

USAP permits a node to assign itself transmit slots based on information it has regarding when it is assigned to transmit and receive and when a neighboring node is scheduled to transmit. The original USAP embodiments were designed for use with half-duplex radios and therefore do not support full-duplex communication. Since a full-duplex radio can transmit and receive at the same time, the use of full-duplex radios presents the potential of doubling network throughput relative to half-duplex radios. As a result, there exists a need for a dynamic assignment protocol that can support full-duplex radios. This need is addressed and fulfilled by the detailed description provided below.

SUMMARY OF THE INVENTION

It is an object of the present invention to provide an improved dynamic assignment protocol.

It is a feature of the present invention to utilize an assignment formula particularly suited to the support of full-duplex radios.

It is an advantage of the present invention to enable a dynamic assignment protocol such as USAP to be used in a network containing full-duplex radios.

The present invention provides an improved dynamic assignment protocol suitable for use with full-duplex radios. It is carried out in a "contention-less" manner such that collisions between communications transmitted between full-duplex radios are avoided. The invention includes embodiments for determining unicast and broadcast communication slot allocations.

BRIEF DESCRIPTION OF THE DRAWINGS

The invention may be more fully understood by reading the following description of the invention, in conjunction with the appended drawings wherein:

FIG. 3 is a diagram of a time division multiple access structure suitable for use with the present invention.

DETAILED DESCRIPTION

Prior to the development of USAP, a heuristic approach was typically taken to design an application specific protocol that both chose the number of time slots to assign to each neighboring node and coordinated their activation. The USAP approach separates the slot assignment mechanism from the heuristic and creates a single generalized protocol for reliably choosing the slots and coordinating their activation. A dynamic assignment protocol such as USAP can be used to support higher level heuristics.

A node can transmit to its neighbors via essentially one of two different methods. One method, node activation, allows only one active transmitter in a neighborhood in a given time slot. The other method, link activation, can permit more than one simultaneous transmission in the same time slot.

In the node activation technique, a single transmitting node communicates data to all of its neighbors simultaneously rather than on an individual basis. Node activation, also known as multicast or broadcast communication, is especially well suited for applications like address resolution and conferencing.

Figure 1:
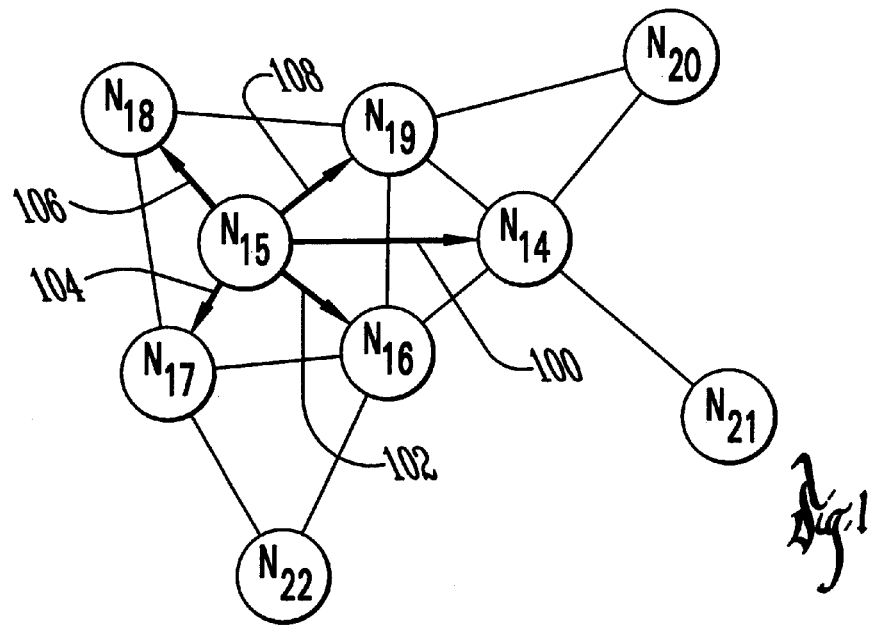
FIG. 1 is a diagram illustrating a node activation form of communication.

The node activation technique is illustrated in FIG. 1. In FIG. 1, a transmitting node $N_{15}$ is simultaneously sending 100, 102, 104, 106, 108 the same broadcast communication to each of its neighbor nodes $N_{14}$, $N_{16}$, $N_{17}$, $N_{18}$ and $N_{19}$.

Figure 2:
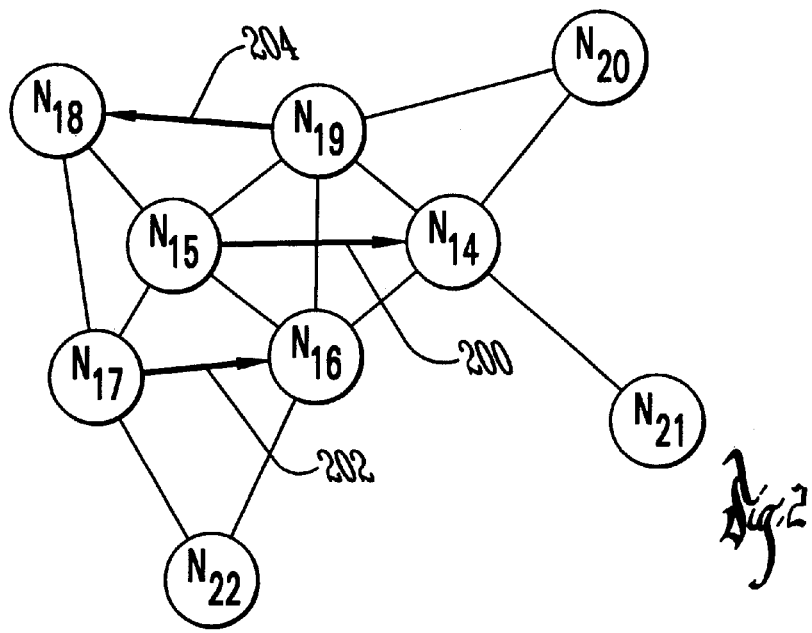
FIG. 2 is a diagram illustrating a link activation form of communication.

In the link activation technique, the transmitting node has only one intended receiver. Link activation, also known as unicast communication, better serves high volume point-to-point traffic. The link activation technique is illustrated in FIG. 2. In FIG. 2, three unicast transmissions are occurring simultaneously. Node $N_{15}$ is transmitting a unicast message 200 to node $N_{14}$, node $N_{17}$ is transmitting a unicast message 202 to node $N_{16}$ and node $N_{19}$ is transmitting a unicast message 204 to node $N_{18}$. In a full-duplex embodiment, each of the receiving nodes $N_{14}$, $N_{16}$, $N_{18}$ can also be simultaneously transmitting back to its respective transmitting node $N_{15}$, $N_{17}$, $N_{19}$.

Referring to FIG. 3, a time multiplex structure 300 suitable for use with the present invention is depicted. The time multiplex structure 300 of FIG. 3 is a time division multiple access structure. One cycle 302 of the structure 300 includes "N" frames 304. The number of frames 304 required for a particular embodiment is determined by the specifics of the underlying application.

FIG. 3 also illustrates the structure of a representative frame of the cycle. The time allocated to the representative frame is shown divided into "M" distinct time slots 306. It will be appreciated that different numbers of time slots can be used in the various embodiments of the invention. The first slot of each frame 304 of the cycle 302 is a broadcast slot 308 for network management control packets. One of the N broadcast slots 308 is assigned to each node in the network. Therefore, for a network having N nodes, each node will transmit its control packet once during each cycle 302. More than one broadcast slot per frame can be used if it is desired that each node transmit multiple control packets per cycle 302. Further, the broadcast slots can be dynamically assigned using the USAP approach described herein.

Each frame 304 can also include multiple frequency channels 310. In FIG. 3, "F" different frequency channels are illustrated in the representative frame. Different embodiments of the invention include different numbers of time slots 306, channels 310 and/or frames 304.

In USAP, specific constraints on communication slot allocation are included to avoid interference at any node located within two hops of the transmitting node. Other embodiments of USAP can require three, four or more hops of isolation before reuse of a slot is permitted. For a system, such as USAP, including multiple frequency channels, an allocation involves specification of both a time slot and a frequency channel. For a USAP unicast transmission from a node i to a neighboring node j, the transmit slot allocation is a slot:

that has not been already assigned to node i or node j, in which node i's neighboring nodes are not receiving, and in which node j's neighboring nodes are not transmitting.

For a multicast communication originating from a node i, the transmit slot allocation by node i is one:

that has not already been assigned to node i or any of node i's neighboring nodes; and in which none of node i's neighbors' neighbors are transmitting.

A node such as node i can insure that its allocation s satisfy the above constraints by sharing the following USAP slot sets with its neighboring nodes:

STi—allocations in which node i is transmitting;

SRi—allocations in which node i is receiving; and

NTi—allocations in which node i's neighbors are transmitting.

The size of the above-defined slot sets will vary according to network density and the number of slots and channels being managed. To minimize the size of the control packet, the slot set information can be encoded, for example, as bit maps or as lists. Sharing of the slot set information via the control packets enables USAP to 1) select non-conflicting allocations consistent with the most recent topology measurements, and 2) detect and report conflicts caused by topology changes.

After a transmit allocation is selected, a node has the option of transmitting immediately or waiting until a confirmation is received from each neighbor. The unconfirmed mode is appropriate when it is acceptable to have momentary conflicts due to coincident changes in connectivity or conflicting allocations. The confirmed mode verifies that all neighbors are aware of the allocation and that nothing has occurred to make the allocation inconsistent with the current topology or the other nodes' allocations.

To allocate a communication slot for full-duplex communication, a node first generates the set of slots that are not available because they are already in use locally. In the description that follows, the subscript "i" denotes information about the node performing the allocation and "j" denotes the corresponding information reported by a neighboring node.

The assignments are represented by:

S=set of time slots s;

F=set of frequency channels f.

For a given time slot and channel pair (s, f, the allocating node's transmit/receive sets are:

$STN_i(s, f)$=set of neighbors to which node i transmits on (s, f)

$SRN_i(s, f)$=set of neighbors from which node i receives on (s, f).

The following sets are then derived:

$ST_i(s, f)$=1 if $STN_i(s, f)$ not empty, else 0

$SR_i(s, f)$=1 if $SRN_i(s, f)$ not empty, else 0.

The neighbor node transmit/receive sets are:

$ST_j(s, f)$=the $ST_i(s, f)$ reported by a neighbor node j $SR_j(s, f)$=the $SR_i(s, f)$ reported by a neighbor node j.

Next, the following sets can be derived:

$NT_i(s, f) = \cup ST_j(s, f)$ over all neighbors j of node i $NR_i(s, f) = \cup SR_j(s, f)$ over all neighbors j of node i $NT_j(s, f)$=the $NT_i(s, f)$ reported by a neighbor node j.

If a node i is already transmitting or its neighbor node j is already receiving in slot s on any channel, both nodes are blocked from performing any other communication during slot s. In addition, if node i is receiving or node j is transmitting on any particular channel in slot s, both are likewise blocked. To this end, the following derived sets are useful:

$B_i(s) = ST_i(s) \cup SR_i(s,f)$ $B_j(s) = ST_j(s, f) \cup SR_j(s)$.

To decide which slots and channels are available for full-duplex unicast allocation, a node i constructs the blocked allocations for transmitting to node j by excluding allocations:

that have been already assigned to node i or node j: $B_i(s) \cup B_j(s)$ in which node i's neighbors are receiving: $NR_i(s, f)$ in which node j's neighbors are transmitting: $NT_j(s, f)$ This information is combined as follows:

Blocked(i,j,s,f)=$B_i(s) \cup B_j(s) \cup NR_i(s, f) \cup NT_j(s, f)$

Blocked(i,j,s,f)=1 if node i cannot transmit to node j in (s, f), else

Blocked(i,j,s,f)=0.

To decide which slots and channels are available for full-duplex broadcast allocations, a node i constructs the blocked allocations for transmitting to all of its neighbors by excluding allocations:

that have been already assigned to node i: $B_i(s)$ that have been already assigned to any of node i's neighbors: $\cup_{\forall n \in \{i's\_nbrs\}} B_j(s)$ in which any of node i's neighbors' neighbors are transmitting: $\cup_{\forall n \in \{i's\_nbrs\}} NT_j(s, f)$.

This information is combined as follows:

Blocked(i,s,f)=Bi(s)∪$_{\forall n \in \{i's\_nbrs\}}$Bj(s)∪$_{\forall n \in \{i's\_nbrs\}}$NTj(s,f)

Blocked(i,s,f)=1 if i cannot transmit to any of its neighbors in (s,f), else

Blocked(i,s,f)=0.

The slots not contained in Blocked(i, s, f) are available for use by node i to transmit to its neighbors. When node i allocates one of the available slots for such a purpose, it can receive therein a transmission from any of its neighbor nodes j, without creating conflicts for any other potential receivers in its neighborhood.

It is thought that the method and apparatus of the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely exemplary embodiments thereof.

What is claimed is:

1. A full-duplex communication method, comprising the steps of:

establishing a set of communication slots for a dynamic distributed, multi-channel, time division communication environment, each communication slot defined by a time and a frequency parameter;

dynamically allocating, by nodes needing to communicate via the time division communication environment, communication slots from the set of established communication slots;

sharing, between a plurality of neighboring nodes using the established communication environment, data indicating those communication slots that have been allocated by nodes of the plurality of neighboring nodes and data indicating those communication slots that have been allocated by nodes neighboring the plurality of neighboring nodes; and determining, from the shared data, which communication slots are available for full duplex unicast communication between a particular node and a selected neighboring node.

2. The method of claim 1, further comprising the step of using a determined communication slot for a full-duplex communication.

3. The method of claim 1, wherein said sharing step comprises transmitting, by a member node of the plurality of neighboring nodes, data indicating those communication slots in which the member node is scheduled to transmit, those communication slots in which the member node is scheduled to receive and those communication slots in which a neighbor node of the member node is scheduled to transmit.

4. The method of claim 1, wherein said determining step comprises excluding from availability any communication slot with a time parameter coinciding with an already scheduled transmission, on any channel, of the particular node or coinciding with an already scheduled reception, on any channel, of the selected neighboring node.

5. The method of claim 4, wherein said determining step further comprises excluding from availability any communication slot with a time and frequency parameter coinciding with an already scheduled reception of the particular node or coinciding with an already scheduled transmission of the selected neighboring node.

6. The method of claim 1, wherein said determining step further comprises excluding from availability any communication slot with a time parameter coinciding with an already scheduled transmission, on any channel, of the particular node or coinciding with an already scheduled reception, on any channel, of the selected neighboring node; excluding from availability any communication slot with a time and frequency parameter coinciding with an already scheduled reception of the particular node or coinciding with an already scheduled transmission of the selected neighboring node; excluding from availability any communication slot with a time and frequency parameter coinciding with an already scheduled reception of any neighboring node of the particular node; and excluding from availability any communication slot with a time and frequency parameter coinciding with an already scheduled transmission of any neighboring node of the selected neighboring node.

7. The method of claim 1, wherein the dynamically allocating step allocates communication slots pursuant to a unifying slot assignment protocol.

8. The method of claim 1, further comprising the step of announcing the determined communication slot chosen by the particular node for a full-duplex communication and identifying the selected neighboring node with which the full-duplex communication will be established, the announcing step being performed after said determining step and the announcement being made by the particular node to those nodes neighboring the particular node.

9. The method of claim 8, further comprising the step of receiving a verification from the selected neighboring node that it is available for full-duplex communication during the announced communication slot.

10. A full-duplex communication method, comprising the steps of:

establishing a set of communication slots for a dynamic distributed, multi-channel, time division communication environment, each communication slot defined by a time and a frequency parameter;

dynamically allocating, by nodes needing to communicate via the time division communication environment, communication slots from the set of established communication slots;

sharing, between a plurality of neighboring nodes using the established communication environment, data indicating those communication slots that have been allocated by nodes of the plurality of neighboring nodes and data indicating those communication slots that have been allocated by nodes neighboring the plurality of neighboring nodes; and determining, from the shared data, which communication slots are available for full duplex broadcast communication between a particular node and a selected neighboring node.

11. The method of claim 10, further comprising the step of using a determined communication slot for a full-duplex communication.

12. The method of claim 10, wherein said sharing step comprises transmitting, by a member node of the plurality of neighboring nodes, data indicating those communication slots in which the member node is scheduled to transmit, those communication slots in which the member node is scheduled to receive and those communication slots in which a neighbor node of the member node is scheduled to transmit.

13. The method of claim 10, wherein said determining step comprises excluding from availability any communication slot with a time parameter coinciding with an already scheduled transmission, on any channel, of the particular node or coinciding with an already scheduled reception, on any channel, of the selected neighboring node.

14. The method of claim 13, wherein said determining step further comprises excluding from availability any communication slot with a time and frequency parameter coinciding with an already scheduled reception of the particular node or coinciding with an already scheduled transmission of the selected neighboring node.

15. The method of claim 10, wherein said determining step further comprises excluding from availability any communication slot with a time parameter coinciding with an already scheduled transmission, on any channel, of the particular node or coinciding with an already scheduled reception, on any channel, of any neighbor of the particular node; excluding from availability any communication slot with a time and frequency parameter coinciding with an already scheduled reception of the particular node or coinciding with an already scheduled transmission of any neighbor of the particular node; and excluding from availability any communication slot with a time and frequency parameter coinciding with an already scheduled transmission of any neighbor of any neighboring node of the particular node.

16. The method of claim 10, wherein the dynamically allocating step allocates communication slots pursuant to a unifying slot assignment protocol.

17. The method of claim 10, further comprising the step of announcing the determined communication slot chosen by the particular node for a full-duplex communication and identifying the selected neighboring node with which the full-duplex communication will be established, the announcing step being performed after said determining step and the announcement being made by the particular node to those nodes neighboring the particular node.

18. The method of claim 17, further comprising the step of receiving a verification from the selected neighboring node that it is available for full-duplex communication during the announced communication slot.

* * * * *